US010057759B2

(12) United States Patent
Mazali et al.

(10) Patent No.: US 10,057,759 B2
(45) Date of Patent: Aug. 21, 2018

(54) METHOD FOR PERSONALISING A SECURE ELEMENT

(71) Applicant: OBERTHUR TECHNOLOGIES, Colombes (FR)

(72) Inventors: Kaoutar Mazali, Colombes (FR); Guillaume Larignon, Colombes (FR); Arnaud Danree, Colombes (FR)

(73) Assignee: IDEMIA FRANCE, Colombes (FR)

( * ) Notice: Subject to any disclaimer, the term of this patent is extended or adjusted under 35 U.S.C. 154(b) by 199 days.

(21) Appl. No.: 15/027,502

(22) PCT Filed: Oct. 6, 2014

(86) PCT No.: PCT/FR2014/052529
§ 371 (c)(1),
(2) Date: Apr. 6, 2016

(87) PCT Pub. No.: WO2015/052422
PCT Pub. Date: Apr. 16, 2015

(65) Prior Publication Data
US 2016/0249203 A1     Aug. 25, 2016

(30) Foreign Application Priority Data
Oct. 7, 2013   (FR) ...................................... 13 59690

(51) Int. Cl.
H04L 29/06        (2006.01)
G06F 21/00        (2013.01)
H04W 8/18         (2009.01)
H04W 8/20         (2009.01)
H04W 12/04        (2009.01)
(Continued)

(52) U.S. Cl.
CPC ........... H04W 8/183 (2013.01); H04L 9/0897 (2013.01); H04L 41/0813 (2013.01);
(Continued)

(58) Field of Classification Search
CPC ..... H04W 8/183; H04W 8/205; H04W 12/04; H04L 67/34; H04L 67/303; H04L 9/0897; H04L 41/0813
See application file for complete search history.

(56) References Cited

U.S. PATENT DOCUMENTS

2011/0136482 A1    6/2011  Kaliner
2012/0220281 A1*   8/2012  Chandan ................ H04W 8/26
                                                          455/418
(Continued)

OTHER PUBLICATIONS

PCT International Search Report dated Jan. 9, 2015, International Application No. PCT/FR2014/052529, pp. 1-4.
(Continued)

Primary Examiner — Lisa C Lewis
(74) Attorney, Agent, or Firm — MH2 Technology Law Group, LLP

(57) ABSTRACT

Methods and device for personalizing a secure element (e.g., a eUICC) may include or implement operations for receiving a personalization request issued by an operator to download a personalized profile in compliance with a model into the secure element, and the request may include personalization data, an identifier of the secure element and the identifier of the model. Other operations may include using the identifier of the secure element to identify a pre-personalization server suitable for pre-personalizing the secure element; obtaining a message from the pre-personalization server, the message including a pre-personalization script for the secure element based on the description of the model; generating a personalization script for the secure element by using the pre-personalization script and the personalization data; and sending the personalization script to the secure element, the secure element being suitable for executing the personalization script to install the personalized profile in the secure element.

20 Claims, 3 Drawing Sheets

(51) Int. Cl.
*H04L 9/08* (2006.01)
*H04L 12/24* (2006.01)
*H04L 29/08* (2006.01)

(52) U.S. Cl.
CPC ............ *H04L 67/303* (2013.01); *H04L 67/34* (2013.01); *H04W 8/205* (2013.01); *H04W 12/04* (2013.01)

(56) References Cited

U.S. PATENT DOCUMENTS

| | | | |
|---|---|---|---|
| 2014/0082056 A1* | 3/2014 | Gargiulo | H04L 67/10 709/203 |
| 2014/0164475 A1* | 6/2014 | Gargiulo | H04L 9/32 709/202 |
| 2015/0289140 A1* | 10/2015 | Rudolph | H04W 8/205 455/411 |

OTHER PUBLICATIONS

CSMG, "Reprogammable SIMSs: Technology, Evolution and Implications Final Report", Retrieved from the Internet: http://stakeholders.ofcom.org.uk/binaries/research/telecoms-research/reprogrammable-sims.pdf, Sep. 25, 2012, pp. 1-96.

Jaemin Park et al., "Secure Profile Provisioning Architecture for Embedded UICC", 2013 International Conference on Availability, Reliability and Security, IEEE, Sep. 2, 2013, pp. 297-303.

* cited by examiner

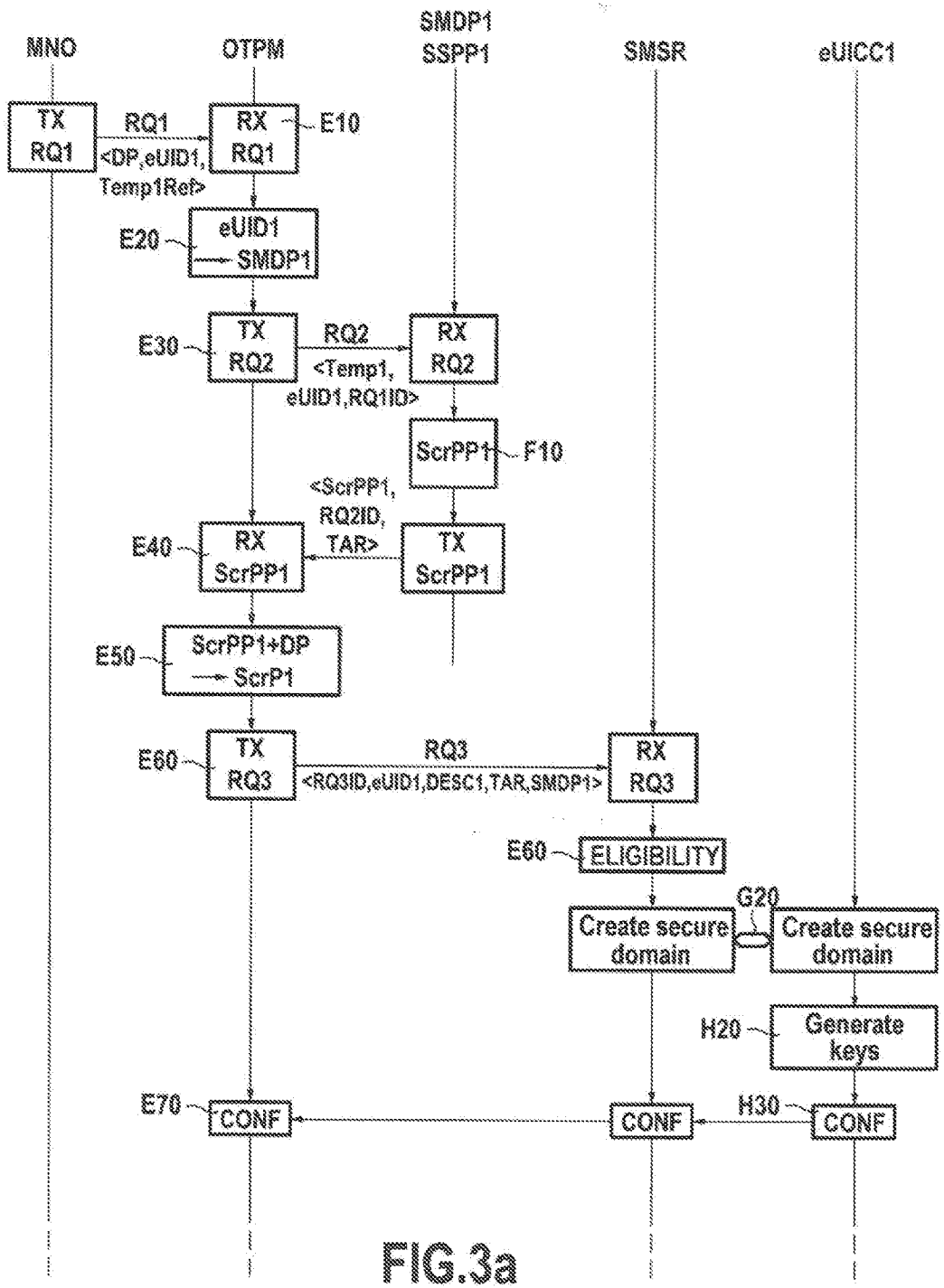

METHOD FOR PERSONALISING A SECURE ELEMENT

CROSS-REFERENCE TO RELATED APPLICATIONS

This application is a U.S. National Stage application of International Application No. PCT/FR2014/052529 filed 6 Oct. 2014, which claims priority to French Application No. 1359690 filed 7 Oct. 2013,the entire disclosures of which are hereby incorporated by reference in their entireties.

BACKGROUND OF THE INVENTION

The present invention lies in the field of personalizing secure elements, e.g. smartcards, and in particular cards of the embedded universal integrated circuit card (eUICC) type.

It is known that subscriber identity module (SIM) cards enable an operator, e.g. a cell phone operator, to define the services to be made available to a client by a mechanism known as "personalization".

Personalization, which is generally performed either by the operator or else by a third party on behalf of the operator, typically a card manufacturer, generally consists in configuring the SIM card with a personalized profile including personalization data and possibly also programs, e.g. applets. Nowadays, SIM cards can store a plurality of profiles, as was not possible when they originated.

The dimensions of removable SIM cards make them difficult to use in appliances of small size. To mitigate this problem, the European Telecommunications Standards Institute (ETSI) has defined a soldered format for SIM cards (MFF2: M2M form factor 2) and the GSMA has defined the software architecture for eUICC secure elements i.e. "a small trusted hardware component, which may be soldered into mobile devices, to run SIM applications and enable the secure changing of subscription identity and other subscription data" together with the solution for administering such eUICC secure elements.

The solution adopted by the GSMA is to defer personalizing eUICCs until the terminal is in the hands of the final user.

FIG. 1 shows the architecture proposed by the GSMA for over the air (OTA) personalization. It relies in particular on subscription management-data preparation servers (SM-DP) suitable for preparing personalization scripts that are executable by the eUICC secure element itself. These personalization scripts comprise a sequence of commands, generally APDU commands in compliance with the ISO 7816-4 APDUs standard.

Also in the present state of the art, the personalization scripts prepared by SM-DP servers are delivered to the eUICC secure element via a subscription management-secure routing (SM-SR) transport server in an OTA session.

It should be noted that personalization scripts are proprietary scripts, such that, in practice, the mobile network operator (MNO) needs to communicate with a different SM-DP server for each card manufacturer.

The invention seeks to provide a personalization method that does not present such drawbacks.

OBJECT AND SUMMARY OF THE INVENTION

Thus, and in a first aspect, the invention provides a method for personalizing a secure element, the method comprising:

a step of receiving a personalization request issued by an operator to download a personalized profile in compliance with a profile model into a secure element, the request including personalization data, an identifier of the secure element and either the profile model, or an identifier of the model;

a step of using the identifier of the secure element to identify a pre-personalization script server suitable for pre-personalizing the secure element;

a step of obtaining from said pre-personalization script server a message including a pre-personalization script for the secure element based on the description of the profile model;

a step of generating a personalization script for the secure element by using the pre-personalization script and the personalization data; and a step of sending the personalization script to the secure element, the secure element being suitable for executing the personalization script to install said personalized profile in the secure element.

Correspondingly, the invention also provides a server for personalizing a secure element, the server comprising:

means for receiving a personalization request issued by an operator to download a personalized profile in compliance with a profile model into a secure element, the request including personalization data, an identifier of the secure element and either the profile model, or an identifier of the model;

means for using the identifier of the secure element to identify a pre-personalization script server suitable for pre-personalizing the secure element;

means for obtaining from the pre-personalization script server a message including a pre-personalization script for the secure element based on the description of the profile model;

means for generating a personalization script for the secure element by using the pre-personalization script and the personalization data; and means for sending the personalization script to the secure element, the secure element being suitable for executing said personalization script to install the personalized profile in the secure element.

Thus, and in very advantageous manner, the invention enables the operator to interface only with the personalization server in accordance with the invention, which server is suitable for communicating with the pre-personalization script servers in order to construct proprietary personalization scripts, in other words scripts specific for different types of card.

Specifically, the invention proposes constructing personalization scripts from:

a pre-personalization script that contains all of the specific or proprietary elements, these scripts being delegated to the pre-personalization script servers; and personalization data that does not make any reference to the proprietary formats.

Thus, in the meaning of the invention, personalization makes it possible to transform a generic pre-personalization profile into a personalized profile associated with a specific service contract. In other words, pre-personalization creates a personalization interface on the card, which interface includes in particular a file system as defined by the ISO 7816-4§ 5 standard, and makes it possible to modify the file system by using standardized commands as defined by the ISO 7818-4§ 6 standard.

Personalization, which is performed via this interface, enables a generic card to be transformed into a card that is specific to the cardholder and to the contract associating the cardholder with a service supplier. The personalization data, such as the name of the cardholder, the keys giving access to a telephone service, a bank account number, for example, are written by using ISO 7816-4§ 6 commands.

In preferred but nonlimiting manner, the servers of pre-personalization scripts used in the invention may be incorporated with or connected to subscription manager-data preparation (SM-DP) servers in the present state of the art as defined in the following document: "Remote Provisioning Architecture for Embedded UICC—Version 1.43—1, Jul. 2013." issued by the GSMA and also in the document "Remote Provisioning Architecture for Embedded UICC—Technical Specification—Draft 1.8—20, Sep. 2013" from the GSMA.

The pre-personalization script may be a new process in a prior art SMDP server.

It should be observed that such prior art SMDP servers are also suitable for processing the request issued by the operator. The servers are:

connected to at least one operator server;

suitable for receiving specifications or models from an operator; and suitable for generating personalization scripts on the basis of internal rules and for sending these scripts to SM-SR transport servers.

Consequently, in this implementation, the invention does not modify the interface between the operator server and the personalization server, nor does it modify the interface between the personalization server and the SM-SR transport server, these interfaces being defined in the GSMA document "Remote Provisioning Architecture for Embedded UICC—Technical Specification—Draft 1.8—20, Sep. 2013".

In a particular implementation of the invention in which the personalization server is suitable for analyzing and modifying the pre-personalization script, the personalization script is generated by incorporating the personalization data in the pre-personalization script.

In another implementation, the personalization script is generated by concatenating said personalization data and the pre-personalization script received from the pre-personalization script server without modifying the pre-personalization script. This implementation is advantageous in particular when the personalization server does not know how to interpret or cannot modify the pre-personalization script.

In a particular implementation, the pre-personalization script and the personalization data of the personalization script are sent to the secure element in a single message.

In a variant, the pre-personalization script and the personalization data for the personalization script are sent to the secure element separately, the personalization data being sent after receiving a message confirming that the pre-personalization script has executed properly in the secure element.

In a particular implementation, the personalization method of the invention includes the step of sending a request to a transport server in order to generate a secure domain on the secure element in which the personalized profile is to be installed.

In a particular implementation, the personalization method of the invention comprises:

a step of obtaining encryption keys generated by the secure element; and a step of encrypting the personalization script with the keys.

In a particular implementation of the personalization method of the invention, the personalization script is sent to a transport server suitable for transmitting the script to the secure element via an over the air (OTA) or an over the Internet (OTI) channel.

In a particular embodiment, the various steps of the personalization method are determined by computer program instructions.

Consequently, the invention also provides a computer program on a data medium, the program being suitable for being performed by a computer, the program including instructions adapted to perform the personalization method as mentioned above.

The program may use any programming language, and it may be in the form of source code, object code, or code intermediate between source code and object code, such as in a partially compiled form, or in any other desirable form.

The invention also provides a computer readable data, medium including instructions of a computer program as mentioned above.

The data medium may be any entity or device capable of storing the program. For example, the medium may comprise storage means such as a read only memory (ROM), e.g. a compact disk (CD) ROM or a microelectronic circuit ROM, or indeed magnetic recording means, e.g. a floppy disk or a hard disk.

The data medium may also be a transmissible medium such as an electrical or optical signal that may be conveyed via an electrical or optical cable, by radio, or by other means. The program of the invention may in particular be downloaded from a network of the Internet type.

Alternatively, the data medium may be an integrated circuit in which the program is incorporated, the circuit being adapted to execute or to be used in the execution of the method in question.

BRIEF DESCRIPTION OF THE DRAWINGS

Other characteristics and advantages of the invention appear in the light of the following description made with reference to the drawings and the appendices, in which.

Appendix 1 provides an example of personalization data;

Appendix 2 provides an example of a profile model;

Appendix 3 provides an example of a pre-personalization script; and

Appendices 4 and 5 provide two examples of personalization scripts.

DETAILED DESCRIPTION OF A FIRST EMBODIMENT

Figure 1:
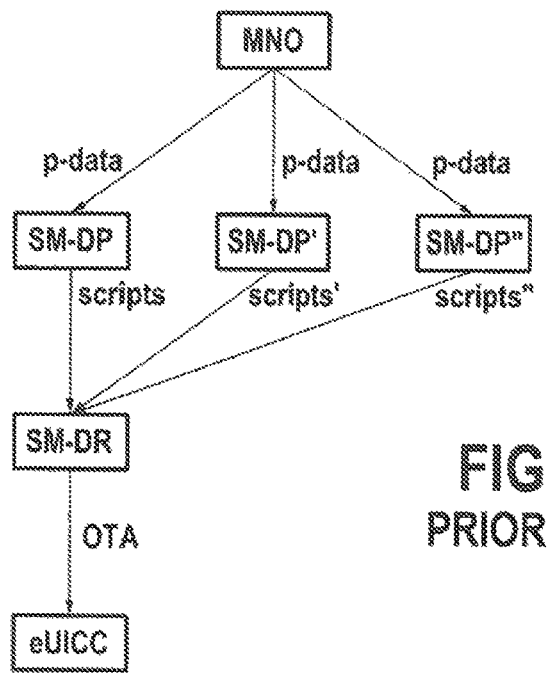
FIG. 1, described above, shows the architecture proposed by the GSMA for OTA personalization.
Figure 2:
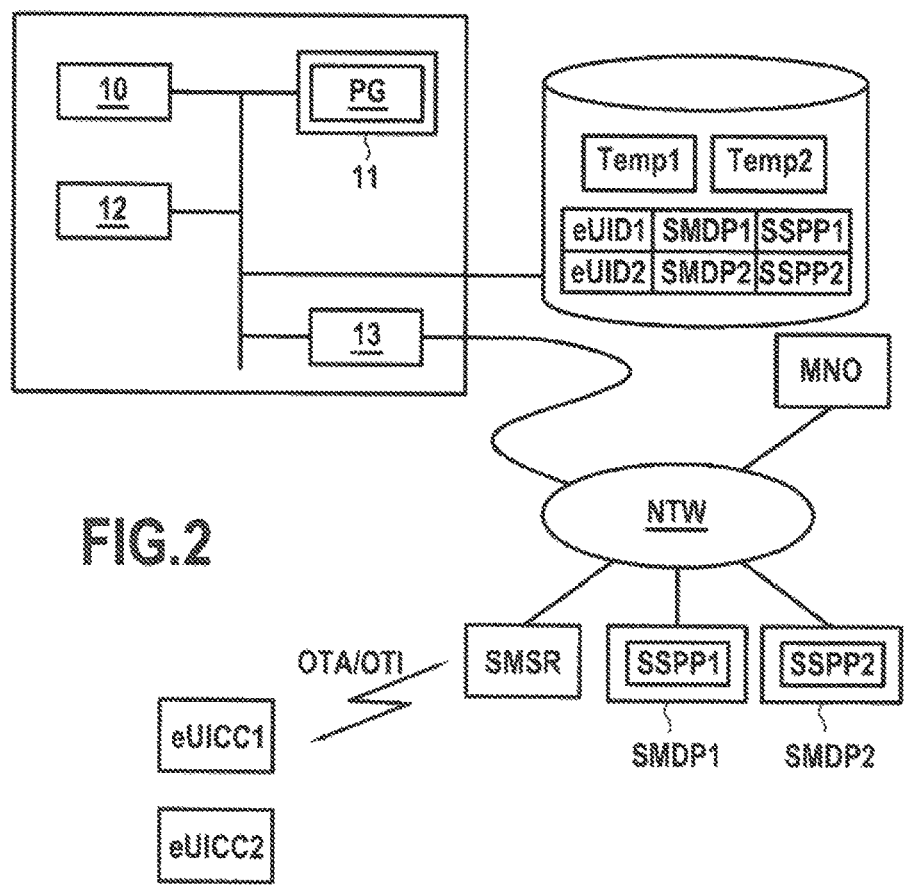
FIG. 2 shows a personalization server in accordance with a particular embodiment of the invention.

FIG. 2 shows a personalization server OTPM in accordance with a particular embodiment of the invention. This server OTPM is connected to the server MNO of a telephony operator, to a profile transport server SMSR and to two pre-personalization servers SMDP1 and SMDP2 via a communications network NTW. Each of these servers SMDP1, SMDP2 differs from prior art SM-DP servers in that it incorporates a pre-personalization script server SSPP1, SSPP2. The transport server SMSR is suitable for communicating with a secure element eUICC1, eUICC2 via an OTA channel or an OTI channel.

The personalization server OTPM has the hardware architecture of a computer. In particular it comprises a processor 10, a ROM 11, a random access memory (RAM) 12, communications means 13, and a database 14.

The database 14 comprises:
profile models Temp1, Temp2 predefined with the operator MNO and described in a structured language; and
a table that associates pre-personalization servers SMDP1, SMDP2 and pre-personalization script servers SSDP1, SSDP2 with the identifiers eUID1, eUID2 of secure elements eUICC1, eUICC2.

Figure 3B:
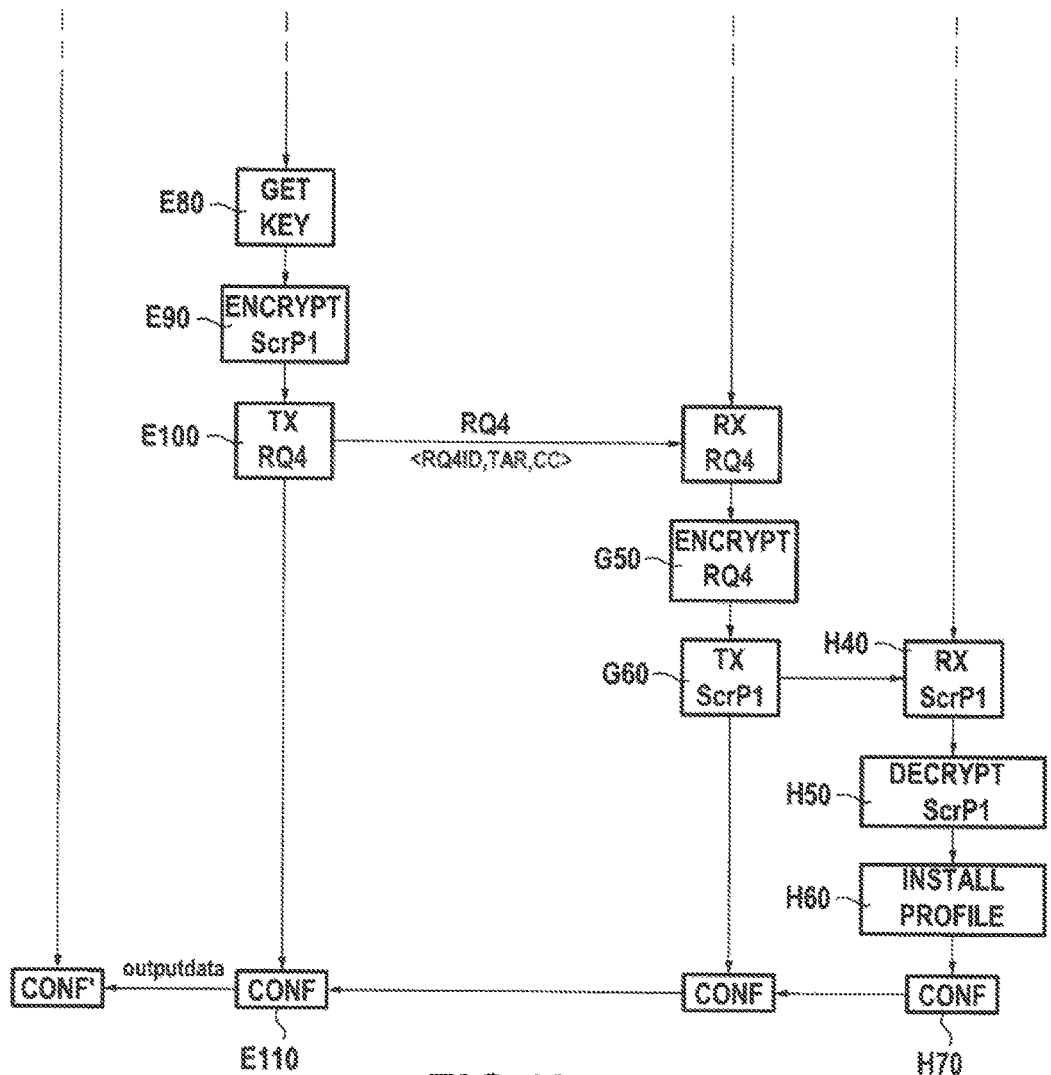
FIG. 3, in the form of a flowchart, shows the main steps of a personalization method in accordance with a particular implementation of the invention.

The ROM 11 constitutes a data medium in accordance with the invention, this medium including a computer program PG suitable for performing a personalization method in accordance with a first implementation of the invention, with its principal steps being shown in the form of a flowchart in FIG. 3.

During a step E10, the personalization server OT-PM receives a personalization request RQ1 issued by an operator MNO in order to download a personalized profile in compliance with the model Temp1 into a secure element eUICC1. This request RQ1 includes personalization data DP of the profile as given in Appendix 1, an identifier eUID1 of the secure element eUICC1, and either the profile model Temp1 or else an identifier Temp1Ref of the profile model.

When the request RQ1 includes the profile model itself, it is stored in the database 14.

An example profile model Temp1 is given in Appendix 2. In this example it is an XML schema that defines a file to be written in the secure element.

The personalization server OT-PM stores the personalization data DP in its database 14 during the step E10.

During a step E20, the personalization server OTPM uses the database 14 to identify the pre-personalization script server SSPP1 capable of generating a pre-personalization script for the secure element eUICC1 on the basis of the identifier eUID1 of this secure element. When the personalization server OTPM is capable of generating a personalization script for a given card without any need to refer to an SMDP, the record for the card will contain, in the field SMDP, a value other than the address of a server SMDP, e.g. a null.

In the presently described implementation, the pre-personalization script server SSPP1 is a process of the pre-personalization server SMDP1.

During a step E30, the personalization server OT-PM uses a secure link to send a request RQ2 to the pre-personalization server SMDP1 in order to obtain a pre-personalization script SPP1 for the secure element eUICC1. This request RQ2 includes the profile model Temp1 corresponding to the identifier Temp1Ref, the identifier eUID1 of the secure element eUICC1, and in this implementation, a reference RQ1ID of the request RQ1 received from the operator in step E10.

The pre-personalization script server SSPP1 acts during a step F10 to generate a pre-personalization script ScrPP1 in the form of a structured data block. This pre-personalization script ScrPP1, based on the description of the profile model Temp1, includes the commands needed for creating the profile requested by the operator MNO. In this example, it is given in Appendix 3.

During a step E40, the personalization server OTPM receives a message over a secure link from the pre-personalization server SPP1, which message includes the pre-personalization script ScrPP1, the identifier RQ2ID of the request RQ2, and a service address to which the pre-personalization script is to be sent in the secure element eUICC1. By way of example, this service address may be constituted by Toolkit Application Reference TAR defined in ETSI specification SCP 101.220. In the presently described implementation, if this service address is not specified, the personalization server OTPM uses the address defined by the standard.

In this first implementation, the personalization server OTPM is suitable for interpreting the pre-personalization script ScrPP1. During a step E50, the personalization server OTPM generates a personalization script ScrP1 by incorporating the personalization data DP in the pre-personalization script ScrPP1. This personalization script ScrP1 is given in Appendix 4 in this example.

During a step E60, the personalization server OTPM sends a request RQ3 to the profile transport server SMSR to cause it to generate a secure domain on the secure element eUICC1, which secure domain is intended, in conventional manner, to ensure security and confidentiality for a personalized profile loaded into the secure element. In the presently described implementation, the request RQ3 includes an identifier RQ3ID of the request RQ3, the identifier eUID1 of the secure element eUICC1, and a description DESC1 of the personalized profile to load into the secure domain, a destination address (e.g. TAR) of the service in the secure element, and the identifier of the pre-personalization server SMDP1.

On receiving this request RQ3, the transport server SMSR acts during an "eligibility" step G10 to verify that the requested profile can indeed be loaded into the secure element eUICC1. This eligibility step may consist in particular in verifying that the amount of memory available in the secure element eUICC1 is sufficient to store the profile.

If this eligibility is confirmed, the transport server SMSR and the secure element eUICC1 communicate during a general step G20, over the OTA channel, to create a secure domain within the secure element eUICC1 in accordance with the GlobalPlatform specifications.

During a "key generation" step H20, a trusted entity of the secure element eUICC1 creates keys and ensures they are kept confidential, these keys being for supplying to the personalization server OTPM as described below.

During a step H30, the secure element eUICC1 confirms to the transport server SMSR that the secure domain has been created and the keys have been generated. In turn, the server SMSR informs the personalization server OTPM that the procedure is taking place properly. This confirmation message is received by the personalization server OTPM during a step E70.

During a step E80, the personalization server OTPM executes a procedure for recovering in confidential manner the keys that were generated within the secure element eUICC1 during step H20. It stores these keys in its database 14.

During a step E90, the personalization server OTPM encrypts the personalization script ScrP1 by using the set of keys recovered in step E80. This encryption, also known as "secure channel" in the GlobalPlatform standard, may for example comply with SCP02 in that standard. After this encryption, the encrypted personalized profile is a script containing a sequence of APDU commands that are decrypted and executed by the secure domain of the secure element eUICC1 that was created in step G20.

During a step E100, the personalization server OTPM sends a request RQ4 to the transport server SMSR, this request including a request identifier RQ4ID, the service address TAR of the secure element eUICC1 and a command CC to load the encrypted personalized profile ScrP1.

During a step G50, the transport server SMSR authenticates the personalization server OTPM chat sent the request and encrypts this request RQ4 for transport so as to open a secure channel in the meaning of the GlobalPlatform standard with the secure element eUICC1, e.g. using the method SCP80 or SCP81 of the GP2.2 specification of that standard.

The transport server sends the encrypted personalization script ScrP1 to the secure domain of the secure element eUICC1 identified by its service address TAR via the OTA or OTI channel during a step G60.

This script is received by the secure element during a step H40. During a step H50, the secure element removes the transport encryption performed in step G50 and then transmits the script to the secure domain. The secure domain then removes the encryption performed by the personalization server OTPM in step E90.

The service identified by its address TAR in the secure element eUICC1 installs the personalized profile by executing the script ScrP1 during a step H60. The installed but not yet active script then passes to a "disabled" state.

During a step H70, the secure element eUICC1 returns an acknowledgement to the transport server SMSR. In turn, the server SMSR informs the personalization server OTPM that the procedure is taking place properly. This confirmation message is received by the personalization server OTPM during a step E110.

The personalization server OTPM updates its database 14 to reflect the changes that have occurred while downloading the profile from the server MNO. Thereafter, it generates an "outputdata" file containing information that is useful for the server MNO in order to activate the profile on its network, and in particular the OTA keys for enabling it to activate the profile once the profile is activated within the secure element eUICC1.

The personalization server OTPM then confirms to the server MNO that the downloading procedure has taken place properly.

First Variant

In the above-described first implementation, the personalization server OTPM is capable of interpreting the pre-personalization script ScrPP1 as received in step E40 and of acting, in step E50, to generate a personalization script ScrP1 by incorporating the personalization data in the pre-personalization script ScrPP1.

In a variant implementation of the invention, the personalization server OTPM is not suitable for interpreting the pre-personalization script SMDP1. Under such circumstances, it can act during a step E50', to create a personalization script ScrP1' that is obtained by concatenating the unmodified pre-personalization script ScrPP1 with the personalization data DP. For this purpose, it is possible to use the technique known to the person skilled in the art as "chained scripts" and as given in Appendix 5.

It should be observed that in the example of Appendix 5, the personalization script ScrP1' uses two service addresses TAR1, TAR2.

Consequently, in this implementation, after the decryption step H50, the secure element eUICC1 separates the two blocks during a step H60', and transmits the pre-personalization script ScrPP1 to the first service address TAR1, which is in charge of installing it. The profile passes to a "pre-personalized" state.

Thereafter, the secure element transmits the second block that corresponds to the personalization data to the service at the address TAR2 in charge of provisioning data.

The service addresses TAR1 and TAR2 may be different or identical.

Second Variant

In the first implementation, and in the above first variant, the pre-personalization script ScrPP1 and the personalization data DP are transmitted by the personalization server OTPM to the secure element eUICC1, via the transport server SMSR in a single request RQ4 (steps E100 and G60).

In a variant, it is possible to perform this downloading in two stages. The following scenario then applies after the steps E80 of recovering keys by the personalization server OTPM:

the server OTPM encrypts only the pre-personalization script, and transmits it to the transport server SMSR;

the transport server SMSR adds transport encryption and transmits the pre-personalization script to the secure element eUICC1;

the pre-personalization script is received by the secure element via the OTA/OTI channel, and it is decrypted and installed in the secure domain;

once the personalization server OTPM has received confirmation, it encrypts the personalization script and reiterates the preceding process (transmission to the transport server SMSR, encryption, transmission to the secure element via the OTA/OTI channel, decryption by the secure element eUICC1 for installation in the secure domain, confirmation, sending the "outputdata" file to the server MNO).

APPENDIX 1

EF 2F00:
    content: 611E4F07A00000000101015013

APPENDIX 2

```
<scdp:DataStructure>
    <scdp:FileStructure arrayElement="EF" arrayIndex="#">
        <scdp:EF fid="2F00" sfi="30" type="LV" format="asn1.efdir"
name="EF_DIR" content=""/>
    </scdp:FileStructure>
</scdp:DataStructure>
```

APPENDIX 3

ISO 7816-4 command to create EF_DIR

APPENDIX 4

ISO 7816-4 command to create EF_DIR
ISO 7816-4 command to write 611E4F07A00000000101015013 to EF_DIR

APPENDIX 5 beginning of chained script
    TAR1
        open session
            encrypted ScrPP1
        close session
    TAR2
        open session
            encrypted   (ISO 7816-4 command to write
                              611E4F07A00000000101015013 to EF_DIR)
        close session
end of chained script

The invention claimed is:

1. A method of personalizing a secure element, the method comprising:
receiving a personalization request issued by an operator to download a personalized profile in compliance with a profile model into the secure element, said request including personalization data, an identifier of the secure element and either said profile model, or an identifier of said profile model;
identifying, using the identifier of the secure element, a pre-personalization server suitable for communicating a pre-personalization script, said pre-personalization script being suitable for pre-personalizing said secure element;
receiving from said pre-personalization server a message including a pre-personalization script for the secure element based on a description of said profile model;
generating a personalization script for said secure element by using said pre-personalization script and the personalization data; and
sending the personalization script to said secure element, said secure element being suitable for executing said personalization script to install said personalized profile in said secure element.

2. The method according to claim 1, wherein said pre-personalization server is connected to a personalization server.

3. The method according to claim 1, wherein said personalization script is generated by incorporating said personalization data (DP) in said pre-personalization script.

4. The method according to claim 1, wherein said personalization script is generated by concatenating said personalization data and the pre-personalization script received from said pre-personalization server without modifying said pre-personalization script.

5. The method according to claim 1, wherein said pre-personalization script and said personalization data of said personalization script are sent to the secure element in a single message.

6. The method according to claim 1, wherein said pre-personalization script and said personalization data for said personalization script are sent to the secure element separately, said personalization data being sent after receiving a message confirming that the pre-personalization script has executed properly in the secure element.

7. The method according to claim 1, further comprising:
sending a request to a transport server in order to generate a secure domain on said secure element in which said personalized profile is to be installed.

8. The method according to claim 1, further comprising:
obtaining encryption keys generated by said secure element; and
encrypting said personalization script with said encryption keys.

9. The method according to claim 1, wherein said personalization script is sent to a transport server suitable for transmitting said personalization script to the secure element via an over the air or an over the Internet channel.

10. A server for personalizing a secure element, the server comprising:
a memory containing instructions;
a processor, operably connected to the memory, that executes the instructions to perform operations comprising:
receiving a personalization request issued by an operator to download a personalized profile in compliance with a profile model into the secure element, the request including personalization data, an identifier of the secure element and either the profile model, or an identifier of the profile model;
identifying, using the identifier of the secure element, a pre-personalization server suitable for communicating a pre-personalization script, the pre-personalization script being suitable for pre-personalizing the secure element;
receiving from the pre-personalization server a message including a pre-personalization script for the secure element based on a description of the profile model;
generating a personalization script for the secure element by using the pre-personalization script and the personalization data; and
sending the personalization script to the secure element, the secure element being suitable for executing the personalization script to install the personalized profile in the secure element.

11. The server according to claim 10, wherein generating the personalization script comprises:
incorporating the personalization data in the pre-personalization script.

12. The server according to claim 10, wherein generating the personalization script comprises:
concatenating the personalization data and the pre-personalization script received from the pre-personalization server without modifying the pre-personalization script.

13. The server according to claim 10, wherein sending the personalization script to the secure element comprises:
sending the pre-personalization script and the personalization data of the personalization script to the secure element in a single message.

14. The server according to claim 10, wherein the operations further comprise:
sending the pre-personalization script and the personalization data for the personalization script to the secure element separately, wherein the personalization data is sent after receiving a message confirming that the pre-personalization script has executed properly in the secure element.

15. The server according to claim 10, wherein the operations further comprise:
sending a request to a transport server in order to generate a secure domain on the secure element in which the personalized profile is to be installed.

16. A non-transitory data medium that is readable by a computer and that stores a computer program including instructions that, when executed by the computer, perform a method comprising:
receiving a personalization request issued by an operator to download a personalized profile in compliance with a profile model into a secure element, the request including personalization data, an identifier of the secure element and either the profile model, or an identifier of the profile model;
identifying, using the identifier of the secure element, a pre-personalization server suitable for communicating a pre-personalization script, the pre-personalization script being suitable for pre-personalizing the secure element;
receiving from the pre-personalization server a message including a pre-personalization script for the secure element based on a description of the profile model;

generating a personalization script for the secure element by using the pre-personalization script and the personalization data; and sending the personalization script to the secure element, the secure element being suitable for executing the personalization script to install the personalized profile in the secure element.

17. The non-transitory data medium according to claim 16, wherein generating the personalization script comprises:
   incorporating the personalization data in the pre-personalization script.

18. The non-transitory data medium according to claim 16, wherein generating the personalization script comprises:
   concatenating the personalization data and the pre-personalization script received from the pre-personalization server without modifying the pre-personalization script.

19. The non-transitory data medium according to claim 16, wherein sending the personalization script to the secure element comprises:
   sending the pre-personalization script and the personalization data of the personalization script to the secure element in a single message.

20. The non-transitory data medium according to claim 16, wherein the method further comprises:
   sending the pre-personalization script and the personalization data for the personalization script to the secure element separately, wherein the personalization data is sent after receiving a message confirming that the pre-personalization script has executed properly in the secure element.

* * * * *